US011722872B2

(12) United States Patent
Tramoni (10) Patent No.: US 11,722,872 B2
(45) Date of Patent: Aug. 8, 2023

(54) NEAR-FIELD COMMUNICATION DEVICE AND METHOD

(71) Applicant: STMicroelectronics (Rousset) SAS, Rousset (FR)

(72) Inventor: Alexandre Tramoni, Le Beausset (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 18 days.

(21) Appl. No.: 17/478,399

(22) Filed: Sep. 17, 2021

(65) Prior Publication Data

US 2022/0103992 A1    Mar. 31, 2022

(30) Foreign Application Priority Data

Sep. 30, 2020   (FR) ...................... 2009975

(51) Int. Cl.
| H04W 4/80 | (2018.01) |
| H02J 50/80 | (2016.01) |
| H02J 50/10 | (2016.01) |
| H04B 5/00 | (2006.01) |

(52) U.S. Cl.
CPC ............... *H04W 4/80* (2018.02); *H02J 50/10* (2016.02); *H02J 50/80* (2016.02); *H04B 5/0025* (2013.01)

(58) Field of Classification Search
CPC ........... H04W 4/80; H02J 50/80; H02J 50/10; H04B 5/0025
See application file for complete search history.

(56) References Cited

U.S. PATENT DOCUMENTS

| 9,634,727 | B2* | 4/2017 | Ozenne ............... H04B 7/0602 |
| 10,632,317 | B2* | 4/2020 | Meskens ............. H02J 50/80 |
| 11,316,378 | B1* | 4/2022 | Melone ............... H02J 50/80 |
| 2009/0027168 | A1* | 1/2009 | Tuttle .................... H04B 5/00 340/10.2 |
| 2011/0080051 | A1 | 4/2011 | Lee et al. |
| 2014/0227970 | A1* | 8/2014 | Brockenbrough ... H04B 5/0043 455/41.1 |
| 2017/0012535 | A1* | 1/2017 | Raymond ............ H02M 3/28 |
| 2017/0093230 | A1* | 3/2017 | Yundt .................. H04B 3/548 |
| 2017/0180010 | A1* | 6/2017 | Michel ............. G06K 7/10009 |
| 2017/0246462 | A1* | 8/2017 | Meskens ............ A61N 1/3787 |
| 2017/0366232 | A1 | 12/2017 | Lee et al. |
| 2019/0148989 | A1* | 5/2019 | Nakahara ........... H01F 27/327 307/104 |
| 2019/0190567 | A1* | 6/2019 | Moon ................. H04B 5/0037 |
| 2020/0119597 | A1 | 4/2020 | Cheikh |
| 2022/0103992 | A1* | 3/2022 | Tramoni ............ H04B 5/0037 |
| 2022/0239343 | A1* | 7/2022 | Melone .............. H04B 5/0037 |
| 2022/0239344 | A1* | 7/2022 | Kapolnek ............. H02J 50/12 |
| 2022/0239345 | A1* | 7/2022 | Peralta .................. H02J 50/20 |

(Continued)

FOREIGN PATENT DOCUMENTS

| EP | 3211805 A1 * | 8/2017 | ............ H01F 38/14 |
| WO | 2013/172530 A1 | 11/2013 | |

*Primary Examiner* — Adam D Houston
(74) *Attorney, Agent, or Firm* — Seed IP Law Group LLP (57) ABSTRACT

A method includes detecting, by a first near-field communication device, the presence of a second near-field communication device. In a case where the second device is intended to be charged in near-field by the first device, the method further includes adjusting, by a control device, an impedance of an impedance matching circuit forming part of a near-field communication circuit of the first device.

20 Claims, 3 Drawing Sheets

(56) References Cited

U.S. PATENT DOCUMENTS

2022/0239355 A1* 7/2022 Katz ..................... H04W 4/80
2022/0273307 A1* 9/2022 Shelton, IV ..... A61B 17/07207
2022/0343089 A1* 10/2022 Turner ............... G06K 7/10475

* cited by examiner

NEAR-FIELD COMMUNICATION DEVICE AND METHOD

BACKGROUND

Technical Field

The present disclosure generally concerns electronic devices. The present disclosure more particularly concerns electronic devices integrating a near-field communication circuit (NFC), more commonly called NFC devices, and near-field communication devices implemented by these devices.

Description of the Related Art

NFC devices capable of implementing, in addition to methods of near-field data exchange between NFC devices, methods of near-field power transfer aiming at charging a NFC device with another NFC device, are known. Such NFC devices however turn out being complex, bulky, and expensive.

BRIEF SUMMARY

There is a need to improve near-field communication devices and their known communication methods.

An embodiment overcomes all or part of the disadvantages of near-field communication devices and of their known communication methods.

An embodiment provides a method comprising the steps of:

a) detection, by a first near-field communication device, of the presence of a second near-field communication device; and b) in a case where the second device is intended to be charged in near-field by the first device, adjustment, by a control device, of an impedance of an impedance matching circuit forming part of a near-field communication circuit of the first device.

An embodiment provides a near-field communication circuit, intended to be integrated in a first near-field communication device capable of detecting the presence of a second near-field communication device, the near-field communication circuit comprising:

an impedance matching circuit; and a control device, configured to adjust an impedance of the impedance matching circuit in a case where the second device is intended to be charged in near field by the first device.

An embodiment provides a near-field communication device, comprising:

a near-field communication circuit such as described; and a near-field communication antenna, coupled to the near-field communication circuit.

According to an embodiment, the impedance is set:
to a first value, in the absence of the second device; and
to a second value, in the presence of the second device.

According to an embodiment, the detection is conditioned by a variation of an electric current flowing through the impedance matching circuit.

According to an embodiment, the detection is conditioned by an amplitude and phase variation of a signal transmitted by the first device.

According to an embodiment, the detection is conditioned by a transmission of at least one data frame between the first device and the second device.

According to an embodiment, the impedance is adjusted by controlling at least one variable capacitive element of the impedance matching circuit.

According to an embodiment, the impedance is adjusted by connecting, in parallel with a first capacitive element of the impedance matching circuit, at least one second capacitive element.

According to an embodiment, the circuit further comprises a near-field communication controller coupled to the impedance matching circuit.

According to an embodiment, the control device is coupled to the near-field communication controller and to the impedance matching circuit.

BRIEF DESCRIPTION OF THE SEVERAL VIEWS OF THE DRAWINGS

The foregoing and other features and advantages of the present disclosure will be discussed in detail in the following non-limiting description of specific embodiments and implementation modes in connection with the accompanying drawings, in which.

DETAILED DESCRIPTION

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the generation of the radio frequency signals and the interpretation thereof have not been detailed, the described embodiments and implementation modes being compatible with usual techniques of generation and interpretation of such signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

In the present description, the term NFC device designates an electronic device integrating at least one near-field communication circuit (NFC).

Figure 1:
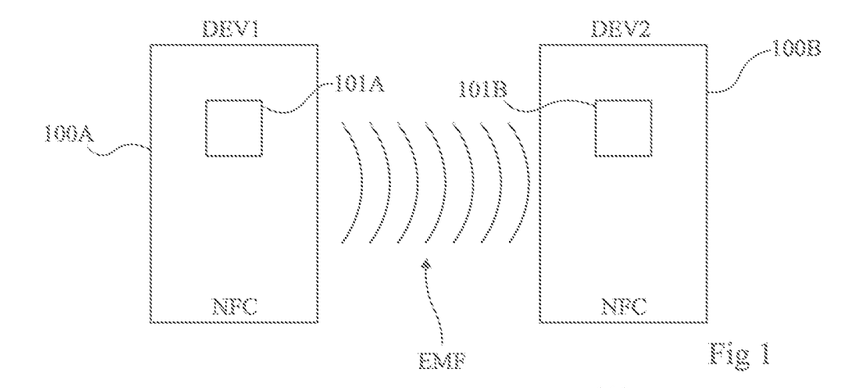
FIG. 1 schematically shows in the form of blocks an example of a near-field communication system of the type to which the described embodiments and implementation modes apply.

FIG. 1 very schematically shows an example of a near-field communication system of the type to which the described embodiments and implementation modes apply.

In the shown example, a first NFC device 100A (DEV1) is capable of communicating, by near-field electromagnetic coupling, with a second NFC device 100B (DEV2). According to applications, for a communication, one of NFC devices 100A, 100B operates in so-called reader mode while the other NFC device 100B, 100A operates in so-called card mode, or the two NFC devices 100A and 100B communicate in peer-to-peer mode (P2P).

Each NFC device 100A, 100B integrates, for example, a near-field communication circuit symbolized, in FIG. 1, by a block 101A, 101B. Near-field communication circuits 101A and 101B for example each comprise various elements or electronic circuits for generating or detecting a radio frequency signal by means of an antenna (not shown), for example, modulation or demodulation circuits. During a communication between NFC devices 100A and 100B, the radio frequency signal generated by one of NFC devices 100A, 100B is for example captured by the other NFC device 100B, 100A located within its range.

In the shown example, it is assumed that NFC device 100A emits an electromagnetic field (EMF) to initiate a communication with NFC device 100B. The EMF field is for example captured by second NFC device 100B as soon as it is within its range. A coupling then forms between two oscillating circuits, in the case in point that of the antenna of NFC device 100A and that of the antenna of NFC device 100B. This coupling for example results in a variation of the load formed by the circuits of NFC device 100B on the oscillating circuit for generating the EMF field of NFC device 100A.

For a communication, a corresponding phase or amplitude variation of the emitted field is for example detected by device 100A, which then starts a protocol of NFC communication with device 100B. On the side of NFC device 100A, it is for example detected whether the amplitude of the voltage across the oscillating circuit and/or the phase shift with respect to the signal generated by circuit 101A come out of amplitude and/or phase ranges each delimited by thresholds.

In the case of a communication, once NFC device 100A has detected the presence of NFC device 100B in its field, it starts a procedure for establishing a communication, for example implementing transmissions of requests by NFC device 100A and of responses by NFC device 100B (polling sequence such as defined in the NFC Forum specifications).

Applications for example aim at taking advantage of the EMF field to implement data exchanges between NFC devices 100A and 100B. This for example corresponds to a case where NFC device 100A is a mobile terminal, for example, a cell phone or a touch pad, and where NFC device 100B is for example a mobile terminal similar to NFC device 100A or a microcircuit card, for example, a personal identification card, mobile terminal 100A then reading or writing data from or into the mobile terminal or from or into microcircuit card 100B.

Other applications for example rather aim at taking advantage of the EMF field to implement power exchanges between NFC devices 100A and 100B. Generally, this for example corresponds to a case where device 100B has an electric power source (not shown), for example a battery, capable of being charged by NFC device 100A. This for example more particularly corresponds to a case where NFC device 100A is a mobile terminal, for example a cell phone or a touch pad, and where NFC device 100B is a connected object, for example a connected watch, a connected bracelet, a pair of wireless earphones, a digital pen, etc. In this case, NFC device 100A for example has a battery with a greater capacity than that of NFC device 100B.

As an example, in the case where NFC device 100A is used to charge NFC device 100B, NFC device 100A is a wireless charging poller (WLC-P) and NFC device 100B is a wireless charging listener (WLC-L). In this case, NFC devices 100A, 100B for example implement a wireless power transfer (WPT) such as defined in the NFC Forum specifications.

Generally, the near-field communication circuit 101A of NFC device 100A is different according to whether the communication with NFC device 100B rather implements data exchanges or power exchanges. Accordingly, if NFC device 100A is equipped with a circuit 101A optimized for data exchanges with NFC device 100B, this circuit then generally does not enable to efficiently charge NFC device 100B. Conversely, if NFC device 100A is equipped with a circuit 101A optimized for power exchanges with NFC device 100B, this circuit then generally does not enable to efficiently communicate with NFC device 100B. This limits the functionalities of NFC device 100A.

To overcome this problem, it may for example be provided to equip NFC device 100A with two near-field communication circuits, optimized, one for data exchanges and the other for the charging of NFC device 100B. This would however result in an increase in complexity, size, and cost of NFC device 100A.

It might for example as a variant be provided to equip the NFC device 100 with near-field communication circuit 101A and with a wireless charging circuit using a standard other than the NFC standard, for example, a circuit according to the "Qi" standard. In addition to the fact of increasing the complexity, the size, and the cost of NFC device 100A, this would have the disadvantage of not being adapted to the charging of devices embedding a power source of small size such as connected objects.

Figure 2:
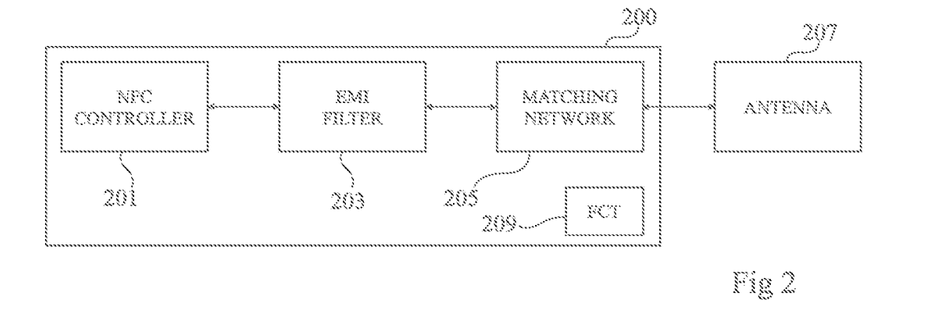
FIG. 2 schematically shows in the form of blocks an example of a near-field communication circuit.

FIG. 2 schematically shows in the form of blocks an example of a near-field communication circuit 200. As an example, circuit 200 corresponds to all or part of block 101A of the NFC device 100A of FIG. 1.

In the shown example, circuit 200 comprises a near-field communication controller 201 (NFC CONTROLLER), or NFC controller. NFC controller 201 is for example an electronic chip or an electronic circuit capable of implementing near-field communications. As an example, NFC controller 201 is a microcontroller.

In the shown example, NFC controller 201 is coupled to an electromagnetic interference filtering device 203 (EMI FILTER), more simply called filter. Filter 203 is for example a circuit comprising electronic components selected and arranged to attenuate one or a plurality of a frequency bands of signals capable of being transmitted or received by NFC controller 201. As an example, filter 203 comprises at least one capacitive element, for example, a capacitor, and at least one inductance, for example, a coil.

In the shown example, electromagnetic interference filter 203 is coupled to impedance matching circuit 205 (MATCHING NETWORK). Impedance matching circuit 205 is typically configured to maximize the amplitude of the signals capable of being transmitted or received by NFC controller 201.

In the shown example, impedance matching circuit 205 is coupled to an antenna 207 (ANTENNA), for example a near-field communication antenna. Generally, circuit 205 is particularly designed to adapt to electric properties of antenna 207. More particularly, impedance matching circuit 205 for example comprises capacitors having their capacitance value selected according to the impedance of antenna 207. The capacitance values may further depend on filter 203. As an example, the capacitance values of the capacitors of impedance matching circuit 205 may be set in factory, at the time of the manufacturing of near-field communication circuit 200, to accurately correspond to the real electric characteristics of antenna 207 and of filter 203.

Near-field communication circuit 200 may further comprise other elements or circuits shown in FIG. 2 by a single functional block 209 (FCT).

Figure 3:
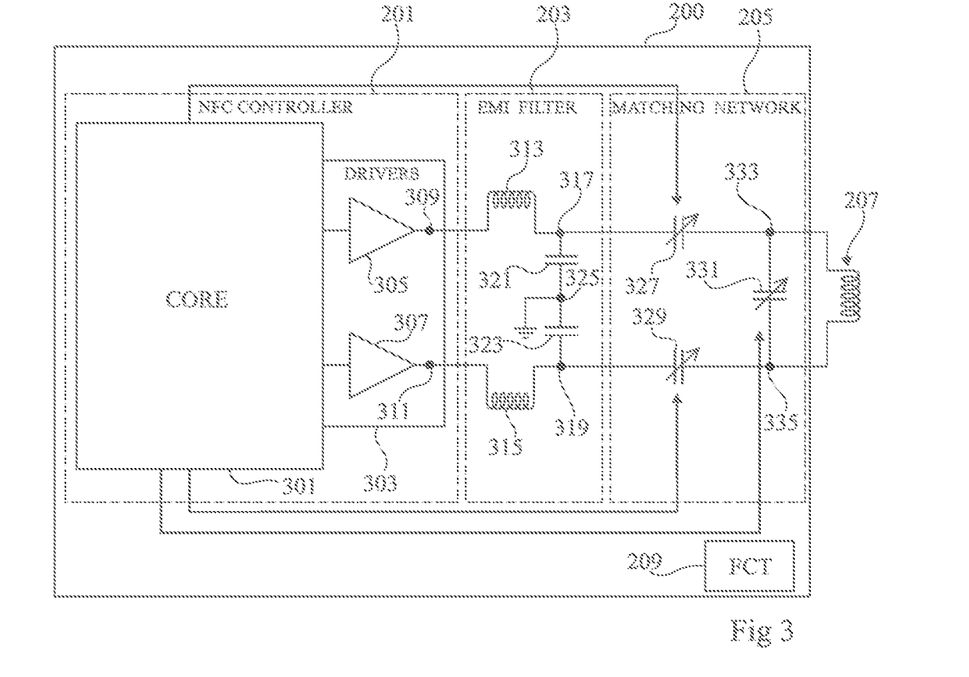
FIG. 3 is an electric diagram of the near-field communication circuit of FIG. 2 according to an embodiment.

FIG. 3 is an electric diagram of the near-field communication circuit 200 of FIG. 2 according to an embodiment.

In the shown example, NFC controller 201 (NFC CONTROLLER) comprises a core 301 (CORE) and an amplifier circuit 303 (DRIVERS). As illustrated in FIG. 3, amplifier circuit 303 for example comprises two amplifiers 305 and 307 ("drivers"). Each amplifier 305, 307 for example comprises an output terminal 309, 311.

The amplifiers 305 and 307 of amplifier circuit 303 are for example controlled by the core 301 of NFC controller 201. As an example, core 301 transmits to amplifiers 305 and 307 radiofrequency signals. These radio frequency signals are then amplified by amplifiers 305 and 307 and then transmitted to filter 203 and to impedance matching circuit 205.

Filter 203 (EMI FILTER) is for example connected to the respective output terminals 309 and 311 of amplifiers 305 and 307. In the shown example, filter 203 comprises inductances 313 and 315, for example coils. Coil 313 is for example connected to terminal 309 and to a node 317 of filter 203. Coil 315 is for example connected to terminal 311 and to another node 319 of filter 203. In the shown example, filter 203 further comprises capacitive elements 321 and 323, for example, capacitors. Capacitor 321 is for example connected to node 317 and to a node 325 of application of a reference potential, for example, the ground. Capacitor 323 is for example connected to node 319 and to node 325.

According to an embodiment, impedance matching circuit 205 comprises at least one variable capacitive element. In the shown example, impedance matching circuit 205 comprises variable capacitive elements 327, 329, and 331, for example, capacitors, having a variable electric capacitance. Capacitor 327 is for example connected to node 317 and to a node 333 of impedance matching circuit 205. Capacitor 329 is for example connected to node 319 and to another node 335 of impedance matching circuit 205. Capacitor 331 is for example connected to node 333 and to node 335.

In the shown example, antenna 207 is connected to nodes 333 and 335. Variable-capacitance capacitors 327 and 329 are series-connected between NFC controller 201 and antenna 207. Variable-capacitance capacitor 331 is connected in parallel with antenna 207. For simplification, capacitors 327 and 329 are called series capacitors and capacitor 331 is called parallel capacitor.

In the shown example, capacitors 327, 329, and 331 are controlled by NFC controller 201. More particularly, NFC controller 201 is for example configured to transmit to each capacitor 327, 329, 331 a control signal enabling to modify its electric capacitance. In this case, NFC controller 201 for example forms a control device configured to adjust the impedance of circuit 205.

Variable-capacitance capacitors 327, 329, and 331 particularly enable to adjust the impedance of impedance matching circuit 205. In the example where NFC device 100A integrates circuit 200, the capacitance values of capacitors 327, 329, and 331 may for example be adjusted according to the type of device 100B located within its range. As an example, it may be provided to adjust the capacitance values of capacitors 327, 329, 331 according to a first configuration intended to optimize data transmissions by antenna 207, for example, in the case of a data exchange between NFC devices 100A and 100B. It may further be provided to adjust the capacitance values of capacitors 327, 329, and 331 according to a second configuration intended to optimize power exchanges by antenna 207, for example, in the case of the charging of NFC device 100B by NFC device 100A.

Although an example comprising two series capacitive elements 327 and 329 and one parallel capacitive element 331 has been described herein, it will be within the abilities of those skilled in the art to adapt the number of parallel capacitive elements and of series capacitive elements according to the targeted application. Further, although the embodiment of FIG. 3 is discussed in relation with an example of application to a communication circuit 200 connected to an antenna comprising two terminals or ends ("dual-ended antenna"), this embodiment can be transposed by those skilled in the art to a communication circuit connected to an antenna comprising a single terminal or end ("single-ended antenna").

An advantage of the embodiment of the circuit 200 described in relation with FIG. 3 lies in the fact that variable capacitive elements 327, 329, and 331 enable to adjust the impedance of circuit 205 according to the type of NFC device 100B located within its range. It is thus for example avoided to integrate a plurality of near-field communication circuits and/or a plurality of antennas in NFC device 100A. This enables to decrease the complexity, the dimensions, and the cost of NFC device 100A.

Figure 4:
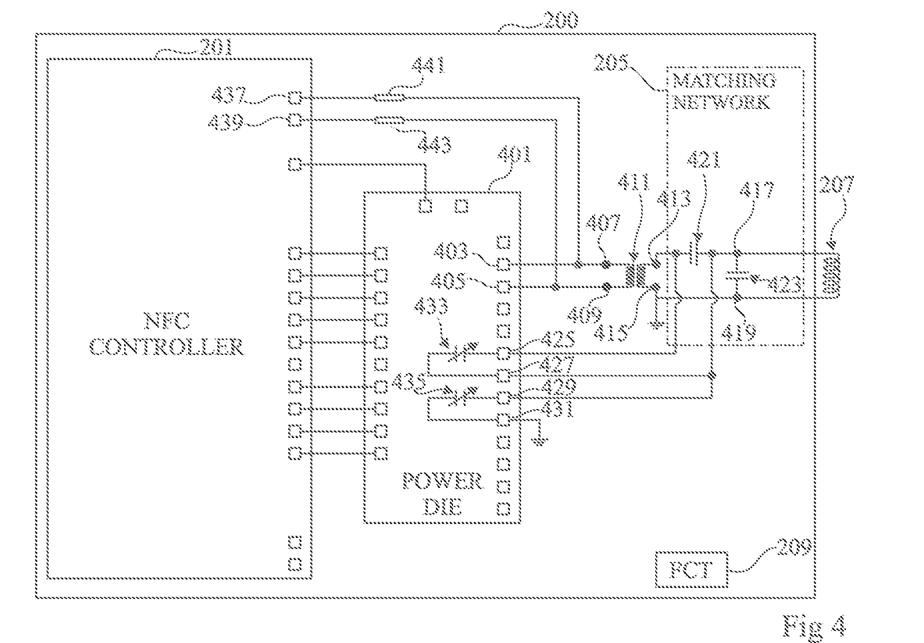
FIG. 4 is an electric diagram of the near-field communication circuit of FIG. 2 according to another embodiment.

FIG. 4 is an electric diagram of the near-field communication circuit 200 of FIG. 2 according to another embodiment. The circuit 200 of FIG. 4 comprises elements common with the circuit 200 of FIG. 3. These common elements will not be detailed again hereafter. The circuit 200 of FIG. 4 differs from the circuit 200 of FIG. 3 mainly in that the circuit 200 of FIG. 4 comprises a control circuit 401 (POWER DIE).

In the shown example, terminals of NFC controller 201 (NFC CONTROLLER) are connected to terminals of control circuit 401. As an example, this enables control circuit 401 to receive synchronization signals, selection signals, data signals to be transmitted by antenna 207, etc.

In the shown example, terminals of control circuit 401 are connected to impedance matching circuit 205 (MATCHING NETWORK). More particularly, terminals 403, 405 of control circuit 401 are respectively connected to terminals 407, 409 of a transformer 411, for example, an insulation transformer. Two other terminals 413, 415 of insulation transformer 411 are for example coupled or connected to nodes 417, 419 of impedance matching circuit 205. Node 419 is for example a node of application of a reference potential, for example, the ground.

In the shown example, a capacitor 421 is connected to terminal 413 of insulation transformer 411 and to node 417 of impedance matching circuit 205. Another capacitive element 423 is for example connected to nodes 417 and 419 of impedance matching circuit 205. Antenna 207 is for example connected to nodes 417 and 419 of impedance matching circuit 205, in parallel with capacitive element 423. As an example, capacitive elements 421 and 423 are capacitors having a fixed electric capacitance.

In the shown example:
 another terminal 425 of control circuit 401 is connected to terminal 413 of insulation transformer 411;
 another terminal 427 of control circuit 401 is connected to node 417 of impedance matching circuit 205;
 another terminal 429 of control circuit 401 is connected to node 417 of impedance matching circuit 205; and
 another terminal 431 of control circuit 401 is connected to a node of application of the reference potential, the ground in this example.

In the shown example, control circuit 401 comprises a variable capacitive element 433 connected between terminals 425 and 427. Control circuit 401 further comprises another variable capacitive element 435 connected between terminals 429 and 431. In the shown example, variable capacitive element 433 is connected in parallel with the capacitive element 421 of impedance matching circuit 205. Variable capacitive element 435 is connected in parallel with the capacitive element 423 of impedance matching circuit 205. By adjusting the electric capacitance values of variable capacitive elements 433 and 435 of control circuit 401, it is for example possible to modify series and parallel capacitive elements of impedance matching circuit 205.

As an example, the variable capacitive elements 433 and 435 of control circuit 401 are formed from an assembly of capacitive elements, for example, capacitors, connected in parallel to one another and individually selectable. By for example using a control signal transmitted by NFC controller 201 to control circuit 401, it is for example possible to select a number of capacitive elements to be connected in parallel with the capacitive elements 421 and 423 of impedance matching circuit 205 to adjust its impedance. In this case, control circuit 401 for example forms the control device configured to adjust the impedance of circuit 205.

In the shown example, NFC controller comprises terminals 437 and 439 respectively coupled to terminals 407 and 409 of insulation transformer 411 via resistors 441 and 443. Terminals 437 and 439 for example enable to receive signals captured by antenna 207.

An advantage of the near-field communication circuit 200 discussed hereabove in relation with FIG. 4 lies in the fact that the impedance of impedance matching circuit 205 is adjusted by the variable capacitive elements 433 and 435 of control circuit 401. This enables to implement the impedance adjustment functionality without having to modify impedance matching circuit 205, NFC controller 201, and/or antenna 207.

Figure 5:
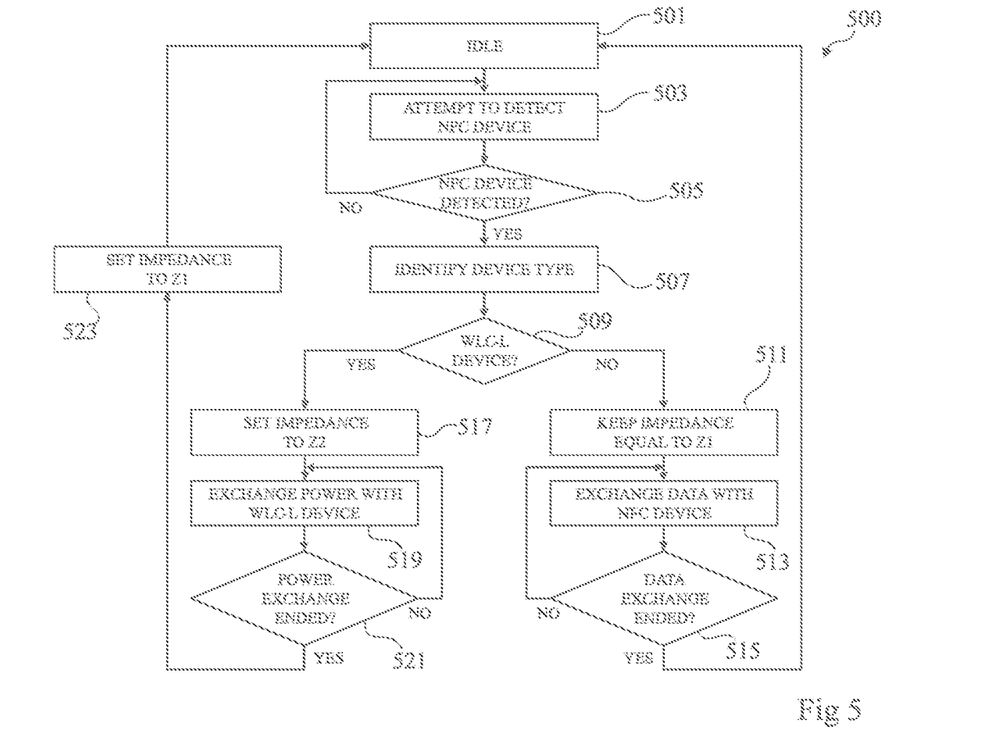
FIG. 5 shows a method of controlling a near-field communication circuit according to an implementation mode.

FIG. 5 shows a method 500 of controlling a near-field communication circuit according to an implementation mode. Method 500 is for example implemented by the circuit 200 previously described in relation with FIGS. 3 and 4. Circuit 200 is for example integrated in NFC device 100A (FIG. 1).

In the shown example, method 500 comprises an initial step 501 (IDLE). As an example, initial step 501 corresponds to a step where circuit 200 implements no near-field communication.

During another step 503 (ATTEMPT TO DETECT NFC DEVICE), subsequent to step 501, near-field communication circuit 200 attempts to detect a NFC device located within its range. This for example corresponds to a field emission such as previously described in relation with FIG. 1.

During still another step 505 (NFC DEVICE DETECTED?), subsequent to step 503, it is verified whether a NFC device, for example, NFC device 100B (FIG. 1) is located within its range. As an example, the detection of NFC device 100B is a function at least one of the following conditions:
 a variation of an electric current flowing through impedance matching circuit 205;
 an amplitude and phase variation of a signal transmitted by NFC device 100A embedding circuit 200; and
 a transmission of at least one data frame between NFC devices 100A and 100B.

In the case where NFC device 100B is detected by NFC device 100A (output YES of block 505), it is proceeded to still another step 507 (IDENTIFY DEVICE TYPE) of identification of the type of NFC device 100B. In the opposite case, that is, if no NFC device is detected during step 505 (output NO of block 505), it is for example returned to step 503.

During step 505, it is for example estimated whether NFC device 100B is intended to exchange data with NFC device 100A or whether NFC device 100B is rather intended to be charged by NFC device 100A.

During still another step 509 (WLC-L DEVICE?), subsequent to step 507, it is verified whether the detected NFC device 100B is of WLC-L type. In the case where NFC device 100B is not of WLC-L type (output NO of block 509), it is proceeded to still another step 511 (KEEP IMPEDANCE EQUAL TO Z1) for keeping the impedance of impedance matching circuit 205 at a first value Z1. Impedance value Z1 for example corresponds to a configuration where the impedance matching circuit 205 of NFC device 100A is optimized to exchange data with NFC device 100B. As an example, value Z1 is equal to approximately 8 ohms.

During still another step 513 (EXCHANGE DATA WITH NFC DEVICE), subsequent to step 511, a data exchange between NFC devices 100A and 100B is for example performed.

During still another step 515 (DATA EXCHANGE ENDED?), subsequent to step 513, it is for example verified whether the data exchange between NFC devices 100A and 100B has ended or whether NFC device 100B has come out of the field. If such is the case (output YES of block 515), it is for example returned to initial step 501. Conversely, that is, for example, if NFC device 100B is still in the field of NFC device 100A and if the data exchange is ongoing (output NO of block 515), it is for example returned to step 513.

At step 509, if the detected device is of WLC-L type (output YES of block 509), it is then proceeded to still another step 517 (SET IMPEDANCE TO Z2) for adjusting the impedance of impedance matching circuit 205 to a second value Z2. Impedance value Z2 for example corresponds to a configuration where the impedance matching circuit 205 of NFC device 100A is optimized to exchange power with NFC device 100B, for example, to charge NFC device 100B. As an example, value Z2 is equal to approximately 12 ohms.

During still another step 519 (EXCHANGE POWER WITH WLC-L DEVICE), subsequent to step 517, NFC device 100A for example starts charging NFC device 100B. During still another step 521 (POWER EXCHANGE ENDED?), subsequent to step 519, it is for example verified whether the charge of NFC device 100B has ended or whether NFC device 100B has come out of the field of NFC device 100A. If such is the case (output YES of block 521), it is proceeded to still another step 523 (SET IMPEDANCE TO Z1) of adjustment of the impedance of impedance matching circuit 205 to first value Z1. Conversely, that is, for example if NFC device 100B is still in the field of NFC device 100A and if the charge is ongoing (output NO of block 521), it is for example returned to step 519.

An advantage of method 500 lies in the fact that the impedance of impedance matching circuit 205 may be adjusted according to the type of the detected NFC device 100B. If NFC device 100B is of WLC-L type, the impedance of circuit 205 is adjusted to favor the charging of NFC device 100B. Conversely, as long as a WLC-L-type device is not detected by NFC device 100A, the impedance of circuit 205 is kept at a value enabling to optimize data exchanges. This particularly enables to more rapidly detect a NFC device 100B desiring to exchange data with NFC device 100A.

Figure 6:
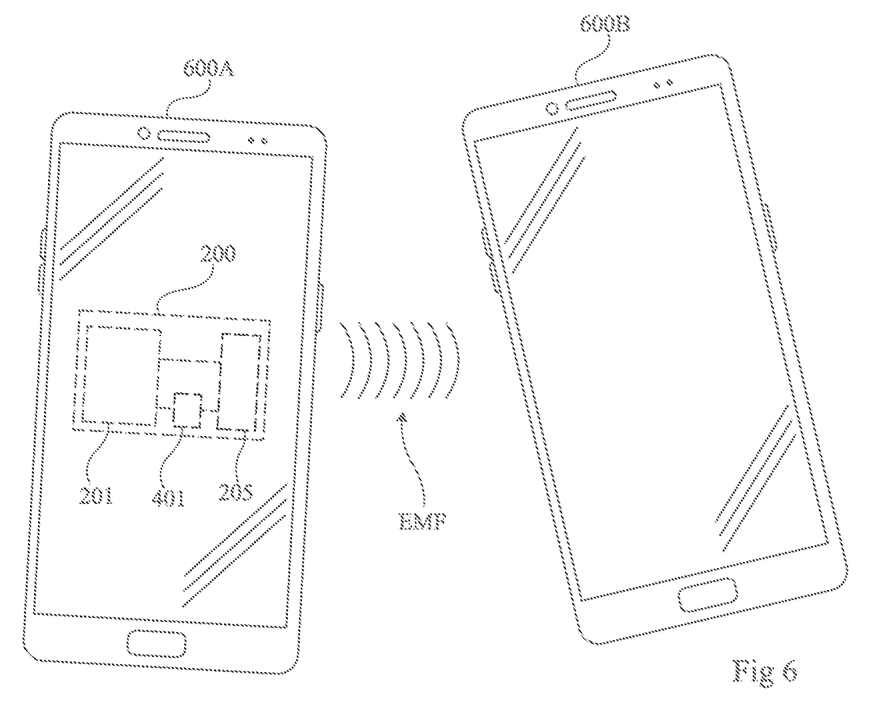
FIG. 6 shows an example of application of the described embodiments and implementation modes to a data exchange between two near-field communication devices.

FIG. 6 shows an example of application of the described embodiments and implementation modes to a data exchange between two near-field communication devices 600A, 600B. In the shown example, NFC devices 600A and 600B are cell phones.

Cell phone 600A for example integrates the near-field communication circuit described in relation with FIG. 4. More particularly, cell phone 600A comprises the NFC controller 201 coupled or connected to control circuit 401 and to impedance matching circuit 205.

Cell phone 600A for example exchanges data with cell phone 600B via electromagnetic field EMF. The impedance of circuit 205 is then for example equal to value Z1.

Figure 7:
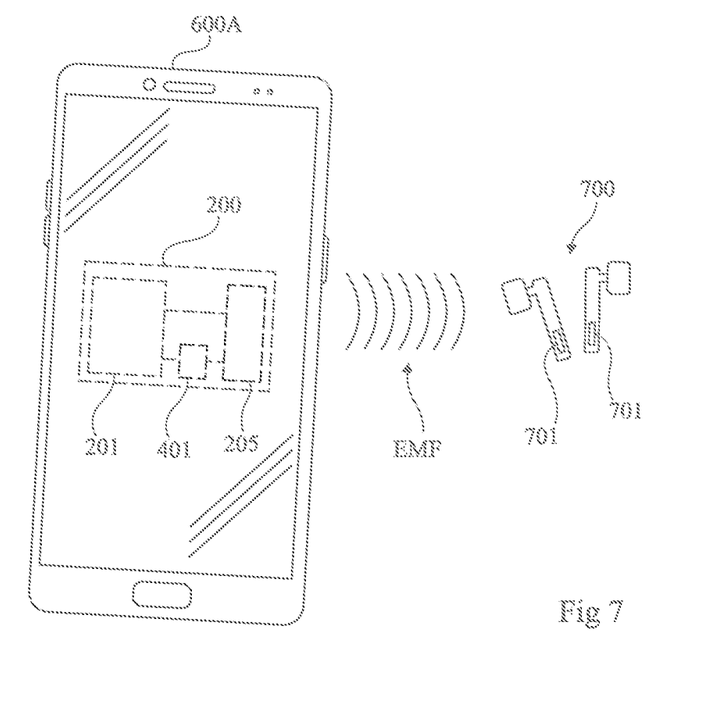
FIG. 7 shows another example of application of the described embodiments and implementation modes to a charging of a device by another device.

FIG. 7 shows another example of application of the described embodiments and implementation modes to a charging of a device 700 by the device 600A of FIG. 6. In the shown example, NFC device 700 is a pair of wireless earphones.

Cell phone 600A for example charges batteries 701 integrated in each earphone of the pair of wireless earphones 700 via electromagnetic field EMF. The impedance of circuit 205 is then for example equal to value Z2.

According to cases, circuit 200 enables device 600A to exchange data with cell phone 600B or to charge the pair of wireless earphones 700 by adjusting the impedance of circuit 205, for example by implementing the method 500 discussed in relation with FIG. 5.

Various embodiments, implementation modes, and variants have been described. Those skilled in the art will understand that certain features of these various embodiments, implementation modes, and variants, may be combined and other variants will occur to those skilled in the art. In particular, the number of variable capacitive elements may be adjusted according to the application.

Finally, the practical implementation of the described embodiments, implementation modes, and variants is within the abilities of those skilled in the art based on the functional indications given hereabove. In particular, it will be within the abilities of those skilled in the art to form the variable capacitive elements so as to obtain impedance ranges corresponding to the targeted application.

Method (500) may be summarized as including the steps of a) detection, by a first near-field communication device (100A; 600A), of the presence of a second near-field communication device (100B; 600B; 700); and b) in a case where the second device is intended to be charged in near-field by the first device, adjustment, by a control device (201; 401), of an impedance of an impedance matching circuit (205) forming part of a near-field communication circuit (200) of the first device.

Near-field communication circuit (200), intended to be integrated in a first near-field communication device (100A; 600A) capable of detecting the presence of a second near-field communication device (100B; 600B; 700), the near-field communication circuit may be summarized as including an impedance matching circuit (205); and a control device (201; 401), configured to adjust an impedance of the impedance matching circuit in a case where the second device is intended to be charged in near field by the first device.

A near-field communication device (100A; 600A) may be summarized as including a near-field communication circuit (200) and a near-field communication antenna (207), coupled to the near-field communication circuit.

The impedance may be set to a first value (Z1), in the absence of the second device (100B; 600B; 700); and to a second value (Z2), in the presence of the second device.

The detection may be conditioned by a variation of an electric current flowing through the impedance matching circuit (205).

The detection may be conditioned by an amplitude and phase variation of a signal transmitted by the first device (100A; 600A).

The detection may be conditioned by a transmission of at least one data frame between the first device (100A; 600A) and the second device (100B; 600B; 700).

The impedance may be adjusted by controlling at least one variable capacitive element (327, 329, 331) of the impedance matching circuit (205).

The impedance may be adjusted by connecting, in parallel with a first capacitive element (421, 423) of the impedance matching circuit (205), at least one second capacitive element (433, 435).

The near-field communication circuit (200) may further include a near-field communication controller (201) coupled to the impedance matching circuit (205).

The control device (401) may be coupled to the near-field communication controller (201) and to the impedance matching circuit (205).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   detecting, by a first near-field communication device, the presence of a second near-field communication device;
   detecting, with the first near-field communication device, whether the second near-field device is a first type of device configured to be charged by the first near-field communication device or a second type of device configured to exchange data with the first device;

if the second near field communication device is the first type of device:
adjusting, by a control device of the first near-field communication device, an impedance of an impedance matching circuit of a near-field communication circuit of the first near-field communication device from a first impedance value to a second impedance value by adjusting a capacitance of a variable capacitor; and
transmitting an electromagnetic field with an antenna of the first near-field communication device while the matching circuit is at the second impedance value;

if the second near-field communication device is the second type of device:
keeping an impedance of the impedance matching circuit unchanged; and
transmitting an electromagnetic field with the antenna while the matching circuit is at the first impedance value.

2. The method according to claim 1, wherein the impedance is set:
to the first value, in the absence of the second device; and
to the second value, in the presence of the second device.

3. The method according to claim 1, wherein the detection is conditioned by a variation of an electric current flowing through the impedance matching circuit.

4. The method according to claim 1, wherein the detection is conditioned by an amplitude and phase variation of a signal transmitted by the first device.

5. The method according to claim 1, wherein the detection is conditioned by a transmission of at least one data frame between the first device and the second device.

6. The method according to claim 1, wherein the impedance is adjusted by controlling at least one variable capacitive element of the impedance matching circuit.

7. The method according to claim 1, wherein the impedance is adjusted by connecting, in parallel with a first capacitive element of the impedance matching circuit, at least one second capacitive element.

8. A near-field communication circuit, configured to be integrated in a first near-field communication device capable of detecting the presence of a second near-field communication device, the near-field communication circuit comprising:
an impedance matching circuit; and
a control device, configured to:
detect whether the second near-field device is a first type of device configured to be charged by the first near-field communication device or a second type of device configured to exchange data with the first device;
adjust an impedance of the impedance matching circuit from a first impedance value to a second impedance value by adjusting a capacitance of a variable capacitor of the impedance matching circuit in a case where the second device is configured to be charged in near field by the first device;
transmit an electromagnetic field with an antenna of the first near-field communication device while the matching circuit is at the second impedance value a case where the second device is configured to be charged in near field by the first device;
keep an impedance of the impedance matching circuit unchanged in a case where the second device is intended to exchange data with the first device, and a same antenna is alternatively used for power exchange and communications; and
transmit an electromagnetic field with the antenna while the matching circuit is at the first impedance value in the case where the second device is intended to exchange data with the first device.

9. The circuit according to claim 8, wherein the impedance is set:
to the first value, in the absence of the second device; and
to the second value, in the presence of the second device.

10. The circuit according to claim 8, wherein the detection is conditioned by a variation of an electric current flowing through the impedance matching circuit.

11. The circuit according to claim 8, wherein the detection is conditioned by an amplitude and phase variation of a signal transmitted by the first device.

12. The circuit according to claim 8, wherein the detection is conditioned by a transmission of at least one data frame between the first device and the second device.

13. The circuit according to claim 8, wherein the impedance is adjusted by controlling at least one variable capacitive element of the impedance matching circuit.

14. The circuit according to claim 8, wherein the impedance is adjusted by connecting, in parallel with a first capacitive element of the impedance matching circuit, at least one second capacitive element.

15. The circuit according to claim 8, further comprising a near-field communication controller coupled to the impedance matching circuit.

16. The circuit according to claim 15, wherein the control device is coupled to the near-field communication controller and to the impedance matching circuit.

17. A near-field communication device, comprising:
a near-field communication circuit configured to be integrated in a first near-field communication device capable of detecting the presence of a second near-field communication device, the near-field communication circuit comprising:
a near field communication antenna coupled to the near field communication circuit;
an impedance matching circuit including a variable capacitor; and
a control device, configured to:
detect whether the second near-field device is a first type of device configured to be charged by the first near-field communication device or a second type of device configured to exchange data with the first device;
adjust an impedance of the impedance matching circuit from a first impedance value to a second impedance value by adjusting a capacitance of a variable capacitor of the impedance matching circuit in a case where the second device is configured to be charged in near field by the first device;
transmit an electromagnetic field with the antenna while the matching circuit is at the second impedance value a case where the second device is configured to be charged in near field by the first device;
keep an impedance of the impedance matching circuit unchanged in a case where the second device is intended to exchange data with the first device, and a same antenna is alternatively used for power exchange and communications; and
transmit an electromagnetic field with the antenna while the matching circuit is at the first impedance value in the case where the second device is intended to exchange data with the first device.

18. The device according to claim 17, wherein the impedance is set:
to the first value, in the absence of the second device; and
to the second value, in the presence of the second device.

19. The device according to claim 17, further comprising a near-field communication controller coupled to the impedance matching circuit.

20. The device according to claim 19, wherein the control device is coupled to the near-field communication controller and to the impedance matching circuit.

* * * * *

UNITED STATES PATENT AND TRADEMARK OFFICE
CERTIFICATE OF CORRECTION

| | |
|---|---|
| PATENT NO. | : 11,722,872 B2 |
| APPLICATION NO. | : 17/478399 |
| DATED | : August 8, 2023 |
| INVENTOR(S) | : Alexandre Tramoni |

It is certified that error appears in the above-identified patent and that said Letters Patent is hereby corrected as shown below:

In the Claims

Column 12, Claim 17, Line 44:
"second near-fieid device"
Should read:
--second near-field device--.

Signed and Sealed this
Tenth Day of October, 2023

Katherine Kelly Vidal
*Director of the United States Patent and Trademark Office*